United States Patent [19]

Musch et al.

[11] Patent Number: 4,740,572
[45] Date of Patent: Apr. 26, 1988

[54] PROCESS FOR THE PRODUCTION OF POLYMERS CONTAINING REACTIVE TERMINAL GROUPS

[75] Inventors: Rüdiger Musch, Bergisch Gladbach; Steven Pask, Dormagen; Renke Mottweiler, Leverkusen; Oskar Nuyken, Munich; Thomas Dittmer, Haar; Hans-Peter Mühlbauer, Feldafing, all of Fed. Rep. of Germany

[73] Assignee: Bayer Aktiengesellschaft, Leverkusen, Fed. Rep. of Germany

[21] Appl. No.: 931,513

[22] Filed: Nov. 17, 1986

[30] Foreign Application Priority Data

Nov. 28, 1985 [DE] Fed. Rep. of Germany ....... 3542000

[51] Int. Cl.⁴ .......................... C08F 2/00; C08F 4/06; C08F 110/10
[52] U.S. Cl. .................................. 526/206; 526/221; 526/237; 526/348.7
[58] Field of Search ............... 526/135, 206, 221, 237, 526/348.7

[56] References Cited

U.S. PATENT DOCUMENTS 4,568,732 2/1986 Kennedy ............................ 526/206
4,611,037 9/1986 Musch ................................ 526/237

*Primary Examiner*—Paul R. Michl
*Assistant Examiner*—Lee C. Wright
*Attorney, Agent, or Firm*—Connolly & Hutz

[57] ABSTRACT

The production of polymers containing terminal halogen groups from cationically polymerizable monomers using a metal halide boiling below 50° C. at normal pressure as catalyst and an organic halide corresponding to the following general formula

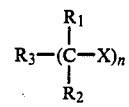

in which
X is halogen,
n is an integer of 1, 2, 3 or 4,
$R_1$ and $R_2$ represent $C_5$–$C_{10}$ cycloalkyl or linear or branched $C_1$–$C_{20}$ alkyl and
$R_3$ represents $C_5$–$C_{10}$ cycloalkyl, linear or branched $C_1$–$C_{20}$ alkyl, $C_5$–$C_{10}$ cycloalkylene, linear or branched $C_1$–$C_{20}$ alkylene or aryl, and the organic halide (inifer) contains from 5 to 50 carbon atoms and is present in concentrations of from $10^{-1}$ to $10^{-6}$ moles per mole monomer while the metal halide is added in a 1.1 to 100-fold molar excess, based on halogen atoms of the organic halide, at temperatures of from $+10°$ to $-130°$ C. in an inert organic solvent or solvent mixture is possible with recovery of the catalyst and with formation of a product having a functionality differing only slightly, if at all, from the theoretical functionality providing the reaction components monomer, catalyst and inifer are continuously introduced into a polymerization apparatus in such a way that all three components are only mixed once they are inside the apparatus, the polymer solution is continuously removed from the apparatus, the polymer solution is freed from residual monomer, unreacted inifer and from the catalyst and worked up.

7 Claims, No Drawings

PROCESS FOR THE PRODUCTION OF POLYMERS CONTAINING REACTIVE TERMINAL GROUPS

This invention relates to a process for the continuous production of macromolecular compounds containing terminal reactive groups by cationic polymerization of cationically polymerizable monomers in the presence of metal halides (catalyst) and certain halogenated hydrocarbons (inifer).

A reaction system which gives products containing two reactive terminal groups, so-called telechelics, by cationic polymerization is described by J. P. Kennedy in J. Polym. Sci., Polymer Chem. Ed. 18, 1523 (1980). Macromolecules such as these containing defined terminal groups are excellent prepolymers for the production of "made-to-measure" copolymers of known, adjustable block length.

In the so-called inifer method described by Kennedy, strict temperature control during polymerization is not possible, even at low temperatures, on account of the high polymerization velocity. Accordingly, it is of technical interest to carry out the polymerization at a near-constant temperature because the reaction temperature critically determines the degree of functionality of the reaction products. In addition, destruction of the catalyst after polymerization, for example by addition of methanol, is undesirable for ecological and economic reasons.

Accordingly, the object of the present invention is to provide a process for the production of telechels without any of the disadvantages referred to above. The invention also seeks to provide a homogeneous polymer free from catalyst residues by an economically simple and safe procedure.

According to the invention, this object is achieved in that the reaction components monomer, catalyst and inifer, optionally dissolved in an inert solvent, are continuously introduced into a continuous polymerization apparatus in such a way that the three components are only mixed once they are inside the apparatus, the polymer solution is continuously removed from the apparatus, the polymer solution is freed from residual monomers, unreacted inifer and from the catalyst and then worked up.

Accordingly, the present invention relates to a process for the production of polymers containing terminal halogen groups from cationically polymerizable monomers using a metal halide boiling below 50° C. at normal pressure as catalyst and an organic halide corresponding to the following general formula

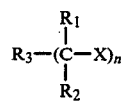

in which
X is halogen,
n is an integer of 1, 2, 3 or 4,
$R_1$ and $R_2$ represent $C_5$–$C_{10}$ cycloalkyl or straight-chain or branched $C_1$–$C_{20}$ alkyl and
$R_3$ represents $C_5$–$C_{10}$ cycloalkyl, straight-chain or branched $C_1$–$C_{20}$ alkyl, $C_5$–$C_{10}$ cycloalkylene, linear or branched $C_1$–$C_{20}$ alkylene or aryl, and the organic halide (inifer) contains from 5 to 50 carbon atoms and is present in concentrations of from $10^{-1}$ to $10^{-6}$ moles per mole monomer while the metal halide is added in a 1.1 to 100-fold molar excess, based on halogen atoms of the organic halide, at temperatures of from $+10°$ to $-130°$ C. in an inert organic solvent or solvent mixture, characterized in that the reaction components monomer, catalyst and inifer, optionally dissolved in an inert organic solvent, are continuously introduced into a polymerization apparatus in such a way that all three components are only mixed once they are inside the apparatus, the polymer solution is continuously removed from the apparatus, the polymer solution is freed from residual monomer, unreacted inifer and from the catalyst and then worked-up.

Suitable reactors are described in H. Guterbock's monography entitled "Polyisobutylen und Isobutylen-Mischpolymerisate (Polyisobutylene and Isobutylene Copolymers)", Springer Verlag 1959.

Suitable monomers for the process according to the invention are cationically polymerizable monomers of the 1-butene, 2-methylbutene, 4-methyl-1-pentene or vinylcyclohexane type, as described in J. P. Kennedy's monography entitled "Cationic Polymerization of Olefins", J. Wiley and Sons, New York, Table 1, Section 1a–d, 39–41, i.e. also vinylethers, for example isobutylvinylether. The preferred monomer is isobutene.

The preferred catalyst is $BCl_3$.

Preferred inifers are those which contain no hydrogen atoms at the carbon atoms in the α-position to the halogen atoms and no hydrogen atoms or at least two hydrogen atoms at the carbon atoms in the β-position.

Particularly preferred inifers are 2,5-dichloro-2,5-dimethylhexane, 9,14-dichloro-9,14-di-n-heptyldocosane, 2,5,8-trichloro-2,5,8-trimethylnonane, 2-chloro-2,3,3-trimethylbutane, 2-chloro-2,4,4,6,6-pentamethylheptane, 2-chloro-2-methylethylbenzene, p-di-(α,α-dimethylchloromethyl)-benzene, 1,3,5-tri-(α,α-dimethylchloromethyl)-benzene.

Polymerization is preferably carried out at 0° to $-60°$ C. in low-boiling solvents. Suitable solvents are, for example, saturated hydrocarbons, such as ethane, propane, butane or pentane, and chlorinated hydrocarbons, such as methylchloride or methylene chloride, or mixtures thereof. It is preferred to use solvent mixtures of which the components differ from one another by at least 50° C. in their boiling points.

Working-up is best carried out as follows:

After the monomer has been almost completely reacted, the polymer solution is continuously run off and heated under slightly reduced pressure in a following expansion vessel. The reduced pressure and temperature are controlled in such a way that, in the case of a solvent mixture, the low-boiling solvent, the catalyst and any monomer still present are removed in the gas phase and separately condensed. The condensates are fractionated in a distillation column. The return flows are then freed from adhering impurities by the usual purifying agents; it is particularly important to ensure that the metal halide is free from traces of monomer and that the return monomer contains no more metal halide. In both cases, traces of entrained organic halide would initiate polymerization of the monomer and, precisely in the case of continuously operated installations, would soon result in blocked pipes. The polymer dissolved in the higher boiling solvent is removed from the expansion vessel and worked up. The return flows are fed back to the polymerization apparatus.

EXAMPLES

A. Preparation of the aromatic halogen compounds p-di-(α,α-dimethylchloromethyl)-benzene (dicumylchloride)

This compound was prepared in accordance with J. P. Kennedy and R. A. Smith, J. Polymer Sci., Polym. Chem. Ed. 18, 1523–37 (1980).

B. Preparation of the aliphatic halogen compound 2,5-dichloro-2,5-dimethylhexane 15 ml 2,5-dimethyl-1,5-hexadiene were dissolved in 150 ml $CH_2Cl$ and the resulting solution cooled to $-30°$ C., after which a mixture of 20 ml thionylchloride and 10 ml $H_2O$ was added dropwise. The mixture was then heated to 0° C. and, after 2.5 hours, was washed with cold 1% by weight aqueous $K_2CO_3$ solution and with ice-cold water. The product was dried over $MgSO_4$ and distilled.

Yield: 81%, Mp.: 64° C.

C. Polymerization procedure

C.1 Determination of average degree of polymerization and functionality

The average degree of polymerization DPn was determined by GPC. A Du Pont 830 HPLC chromatograph was used with the column arrangement 500 A, $10^4$ A and $10^6$ A and with THF as eluent. Polystyrene standards were used for calibration. Assuming polymerization to be completely uninterrupted, the degree of polymerization DPn thus determined should correspond to the theoretical value DPth and the ratio of DPn to DPth should be 1.

The funtionality of the telechelics was determined by 1H-NMR-measurements in which the intensities of the resonance signals of aromatic protons of (I) were compared with the terminal aliphatic methyl protons of (II).

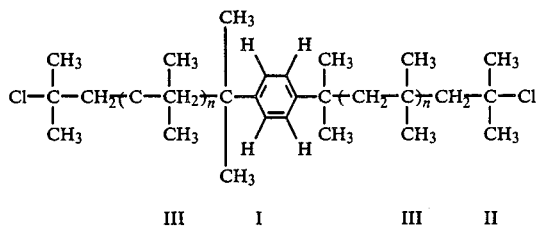

III      I      III    II

For a functionality of 2, they should be in a ratio of 1:3 in the present case.

The functionality of the telechels started by aliphatic halogen compounds, in which component I is thus missing, was determined from the intensity ratio of terminal methyl protons II, the methylene protons III and the molecular weight $M_n$ (GPC).

C.2 Continuous polymerization using dicumylchloride as initiator

The tests were carried out in a 2-vessel reactor. Three pre-cooled produce streams were introduced from below into the first reaction vessel using membrane pumps, run off overhead and introduced into the second reaction vessel, again from below. After an average residence time of 30 minutes, the product was pumped into a constanttemperature degassing tract which was under a vacuum of 0.1 bar. Methylene chloride, $BCl_3$ and the residual monomer could be removed there in the gas phase. The $BCl_3$ was removed at a higher temperature in a second evaporator along with some of the solvent, hexane. The gases were liquefied, freed from HCl and traces of monomer by fractional distillation and then returned to the polymerization zone.

Polymerization conditions

|  | Consumption (ml/h) |
|---|---|
| 1st product stream: | |
| isobutene | 627 |
| 2nd product stream: | |
| dicumylchloride | 29 |
| hexane | 730 |
| 3rd product stream: | |
| $BCl_3$ | 49 |
| $CH_3Cl$ | 5840 |
| hexane | 730 |

Vessel capacity: 2 l
Average residence time: 30 minutes
Reaction temperature: $-28°$ C.

After a polymerization time of 2 hours, a product having a molecular weight of 3500±5%, a DPn/DPth value of 1.1 and a functionality of 1.9±0.2 was obtained in a yield of 90%.

C.3 Continuous polymerization using 2,5-dichloro-2,5-dimethylhexane as initiator The procedure is as in Example C.2, except that the dicumylchloride is replaced by 0.36 g 2,5-dichloro-2,5-dimethylhexane (0.002 mole).

After a polymerization time of 2 hours, a product having a molecular weight of 3000±5%, a DPn/DPth value of 1.0 and a functionality of 2.0±0.1 is obtained in a yield of 95%.

D. Batch polymerization (Comparison test)

The polymerization was carried out in a high-vacuum apparatus of glass by dissolving isobutene and inifer in methylchloride, cooling the mixture to the desired temperature and adding $BCl_3$. Polymerization was carried out and the products worked up in accordance with Makromol. Chem. 184, 553–562 (1983).

Experimental conditions

| Initiator (dicumylchloride) | $1. \times 10^{-3}$ mole |
|---|---|
| Isobutene | 0.05 mole |
| Solvent $CH_3Cl$ | 40 ml |
| Reaction temperature | $-30°$ C. |
| Reaction time | 30 minutes |
| $BCl_3$ | 0.01 mole |

The product showed a distinctly broader molecular weight distribution produced by low molecular weight fractions. The average molecular weight was 3200, the functionality 1.85±0.2 and the yield 85%.

We claim:

1. A process for the production of polymers containing terminal halogen groups from cationically polymerizable monomers using a metal halide boiling below 50° C. at normal pressure as catalyst and an organic halide corresponding to the following general formula

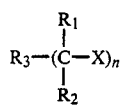

in which

X is halogen, n is an integer of 1, 2, 3 or 4, $R_1$ and $R_2$ represent $C_5$–$C_{10}$ cycloalkyl or straight-chain or branched $C_1$–$C_{20}$ alkyl and $R_3$ represents $C_5$–$C_{10}$ cycloalkyl, straight-chain or branched $C_1$–$C_{20}$ alkyl, $C_5$–$C_{10}$ cycloalkylene, straight-chain or branched $C_1$–$C_{20}$ alkylene or aryl, and the organic halide contains from 5 to 50 carbon atoms and is present in concentrations of from $10^{-1}$ to $10^{-6}$ moles per mole monomer while the metal halide is added in a 1.1 to 100-fold molar excess, based on halogen atoms of the organic halide, at temperatures of from $+10°$ to $-130°$ C. in an inert organic solvent or solvent mixture, characterized in that the reaction components monomer, catalyst and inifer, optionally dissolved in an inert organic solvent, are continuously introduced into a polymerization apparatus in such a way that all three components are only mixed once they are inside the apparatus, the polymer solution is continuously removed from the apparatus, the polymer solution is freed from residual monomer, unreacted inifer, solvent and catalyst and then worked-up.

2. A process as claimed in claim 1, characterized in that isobutylene is used as monomer.

3. A process as claimed in claim 1, characterized in that $BCl_3$ is used as catalyst.

4. A process as claimed in claim 1, characterized in that it is carried out at temperatures of from $-10°$ to $-60°$ C.

5. A process as claimed in claim 1, characterized in that dicumyl and tricumylchloride are used as the organic halide.

6. A process as claimed in claim 1, characterized in that aliphatic halides are used as the organic halide.

7. A process as claimed in claim 1, characterized in that the return flows of catalyst, solvent and any unreacted inifer are returned to the polymerization.

* * * * *